United States Patent [19]

Landino et al.

[11] Patent Number: 4,843,297

[45] Date of Patent: Jun. 27, 1989

[54] MICROPROCESSOR SPEED CONTROLLER

[75] Inventors: Paul J. Landino, New Haven; Michael J. Ramadei, Bethany, both of Conn.

[73] Assignee: Zycron Systems, Inc., West Haven, Conn.

[21] Appl. No.: 902,501

[22] Filed: Sep. 2, 1986

Related U.S. Application Data

[63] Continuation of Ser. No. 670,817, Nov. 13, 1984, abandoned.

[51] Int. Cl.$^4$ ............................................... H02P 5/40
[52] U.S. Cl. .................................... 318/811; 318/798; 318/806
[58] Field of Search ................. 318/806, 798, 807–811

[56] References Cited

U.S. PATENT DOCUMENTS

| | | | |
|---|---|---|---|
| 3,694,718 | 9/1972 | Graf et al. | 318/811 |
| 3,971,972 | 7/1976 | Stich | 318/811 |
| 4,091,294 | 5/1978 | Zankl et al. | 318/808 |
| 4,409,532 | 10/1983 | Hollenbeck . | |
| 4,419,615 | 12/1983 | Muto et al. | 318/811 |
| 4,475,150 | 10/1984 | D'Atre et al. | 318/806 |
| 4,475,631 | 10/1984 | Nomura . | |
| 4,483,419 | 11/1984 | Salihi et al. | 318/759 |
| 4,609,859 | 9/1986 | Williams | 318/810 |

OTHER PUBLICATIONS

Sen et al., "Induction Motor Drives with Microcomputer Control System", IAS Annual Meeting, 1980, Cincinnati, OH., USA (28 Sep.-3 Oct. 1980), pp. 653-662.
Williams, B. W. "Microprocessor Control of DC 3 Phase Thyristor Inverter Circuits", IEEE Transactions on Industrial Electronics and Control Instrumentation, vol. IEEE—27, No. 3, Aug. 1980, pp. 223-228.
Patent Abstracts in Japan, vol. 7, No. 65 (E—165), 3/18/83 "Controller For Induction Motor", by Denki.
Patent Abstracts in Japan, vol. 7, No. 229 (E—203), 10/12/83, "Position Controlling Device for Motor", Seisakusho.
IEEE 1982 IECON Proceedings, 11/82; pp. 90-96, "A Microprocessor Based Controller for a Balanced Three Phase To Single Phase Load Matching Converter", by P. Harmon.

Primary Examiner—David Smith, Jr.
Attorney, Agent, or Firm—St. Onge, Steward, Johnston & Reens

[57] ABSTRACT

An AC Motor Speed Controller used to control the Speed, Torque and Horsepower of an AC motor. It allows the speed of the motor to be adjusted to the desired level and is calibrated to develop the desired torque, either automatically through load feedback or through a predetermined or preset level. It also allows for excessive torque to be developed under starting and acceleration conditions while providing for controlled deceleration with proportional braking of the inertia load.

3 Claims, 15 Drawing Sheets

PHASE 1,2,3 DRIVER 4φ,5φ,6φ

* NOT USED ON PHASE 3 DRIVER 6φ

LOGIC DRIVER MASTER FLOWCHART

Fig.11

Background Loop:
- POWER UP RESET
- SYSTEM INITIALIZATION
- WAIT FOR "START" (NO loops back; YES continues)
- INPUT COMMANDS FROM SERIAL LINK OR FROM STAND-ALONE CONFIGURATION
- NEED TO ACCEL/DECEL? — YES → ACCEL/DECEL FUNCTION
- IN BOOST REGION? — YES → BOOST FUNCTION
- CLOSED-LOOP VOLTAGE REGULATION
- DETERMINE PROPER TIMING FOR VOLTAGE PRESTAGE IT FOR PWM HANDLER
- DETERMINE PROPER TIMING FOR FREQUENCY PRESTAGE IT FOR FREQUENCY HANDLER
- HAS "STOP" BEEN PUSHED? — YES → STOP FUNCTION → TO "WAIT FOR START"; NO loops back

ACCEL/DECEL ALSO HANDLES CURRENT LIMIT AND DYNAMIC BRAKING SUB FUNCTIONS

INTERRUPTS

PWM INTERRUPT HANDLER:
- ENTER INTERRUPT
- TURN DRIVERS ON/OFF WITH PROPER PATTERN FOR PROPER DUTY CYCLE
- INDICATE UNIT TIME TO BACKGROUND LOOP
- RETURN

FREQ. HANDLER:
- ENTER INTERRMED. PT.
- GO FORWARD/REVERSE THROUGH DRIVER SEQUENCE PATTERNS
- PROVIDE PROPER ANTI-SHOOT THROUGH DELAY TIMING
- RETURN

ELECTRONIC CIRCUIT BREAKER INTERRUPT:
- ENTER INTERRUPT
- TURN ALL CONTROL OUTPUTS OFF
- GO TO RESET

SERIAL CHANNEL INTERRUPTS:
- ENTER
- SEND/RECEIVE/COMMAND/DATA/STATUS
- RETURN

MICROPROCESSOR SPEED CONTROLLER

This is a continuation of co-pending application Ser. No. 670,817, filed on Nov. 13, 1984, now abandoned.

BACKGROUND OF INVENTION

(A) INVENTION FIELD

The invention relates the the control of an AC motor via a simple means with respect to both frequency and voltage. Utilization of a microprocessor allows for optimization of the motor controller to the motor and load thereby developing a simple efficient drive system.

(B) GENERAL DESCRIPTION OF PRIOR ART

AC motor speed controllers (inverters, drives) have in the past been very large, complicated, inefficient and costly limiting the wide spread use of such a product. Technological advancements in the Microprocessor industry and the Power Semiconductor industries have lead to improvements and cost reduction of several of the components that make up such a controller. As kowledge on the use of motors and their applications has increased, higher performance capacities and effeciencies have become available. In addition, the use of motor speed controlers in the past have been limited to simple control, that is, manual adjustment of the speed. Recent advancements in Process Control have demanded that motor controllers become smart in their ability to communicate with other types of control equipment.

(C) OBJECT OF INVENTION

It is the object of this invention to prove that the use of a central, single Microprocessor combined with power semiconductors in a unique base drive setup, can be a simple and low cost manner in which to control Speed, Torque and Horsepower of a standard AC induction Motor at, below or above its nominal rating.

(D) SUMMARY OF THE INVENTION

The invention disclosed herein is an AC Motor Speed Controller, that provides total control over the output characteristics of the AC motor by the control of frequency and voltage to the said motor at, below or above its nominal ratings.

The invention provides the ability to control Speed of said motor through the application of frequency applied to the motor as demanded by the controlling function. At the selected operating speed (frequency), the invention allows the voltage to be controlled to the motor which develops Torque. The combination of Speed and Torque then determines Horsepower. With individual control of both frequency and voltage, which can be preprogrammed, it allows for characterization of the output Volts per Hertz curve to the motor (output of the controller) thereby providing effective control of the Speed, Torque and Horsepower developed by the motor. Such control can be predetermined and preset or controlled by changing load conditions if programmed to do such.

To achieve the above, the controller consists of two basic sections, the Power Section and the Logic Section.

The Power Sections function is to handle all of the main power utilized by the Motor (00) itself. This consists of a Power Rectifier (20), Filter Capacitor(s) (10-23) and three Phase Modules (40,50,60). This allows for the incoming single or three phase AC to be rectified to DC and filtered. If operated off of a straight DC source, such as a battery pack, direct connection to the Phase Modules would occur. The Phase Modules, at the direction and control of the Logic Section then output and concert the DC to Variable Frequency and Variable Voltage (through the use of a Pulse Width Modulation Technique [PWM]) which is then outputed to the Motor (00) for control. Dynamic Braking (80) is automatically introduced on a scaled level under a controlled deceleration.

The Logic Section (30) controls the Power Section based on desired operating Speed, Current Feedback and Voltage Feedback signals and predetermined preprogrammed requirements. The Logic Section consists of the following: the Microprocessor (30-7) which is preprogrammed and active through out the controlling function, monitoring external functions such as Current, Voltage and Speed command signals to output the appropriate signals to the driver circuits which in turn drive the three Phase Modules (40,50,60); Voltage Feedback circuit (90) monitors output voltage and outputs a voltage proportional to the output voltage of the Inverter; Current Feedback circuit (80) monitor Motor (00) current and outputs an error voltage that is proportional to the output current of the Inverter to the motor. The Electronic Fault Protector circuit (70) monitors currents in and out of the DC buss, incoming line conditions and buss voltage conditions and "shuts down" the Microprocessor (30-7) and Drivers (30-13) to the Phase Modules (40,50,60) when preset trip levels are exceeded.

The overall controller proivides a very simple and controllable means for determining the Speed, Torque and Horsepower output characteristic of the controlling AC motor.

BRIEF DESCRIPTION OF DRAWINGS

FIGURE DESCRIPTION

FIG. 1 OVERAL FUNCTIONAL BLOCK DIAGRAM AND SCHEMATIC

FIG. 2 POWER RECTIFIER SCHEMATIC

FIG. 3 LOGIC/DRIVER SCHEMATIC

FIG. 4 PHASE DRIVER 40, 50, 60 SCHEMATIC

FIG. 5 DYNAMIC BRAKING SCHEMATIC

FIG. 6 POWER SUPPLY SCHEMATIC

FIG. 7 ELECTRONIC FAULT PROTECTOR SCHEMATIC

FIG. 8 CURRENT FEEDBACK SCHEMATIC

FIG. 9 VOLTAGE FEEDBACK SCHEMATIC

FIG. 10 NEGATIVE PWM POSITIVE TOGGLE DRIVE SIGNALS

FIG. 11 LOGIC/DRIVER MASTER FLOWCHART

FIG. 12 INITIALIZATION ROUTINE FLOWCHART

FIG. 13 MAIN BACKGROUND LOOP FLOWCHART

FIG. 14 BOOST ROUTINE FLOWCHART

FIG. 15 VOLTAGE REG/FREQUENCY CONT. FLOWCHART

FIG. 16 VOLTAGE CONTROL/PWM TIMER FLOWCHART

FIG. 17 FREQUENCY CONTROL TIMER FLOWCHART

FIG. 18 ACC/DEC, DYNAMIC BRAKING AND CURRENT LIMIT FLOWCHART

DETAILED DESCRIPTION OF INVENTION

(A) HARDWARE

Figure 1:
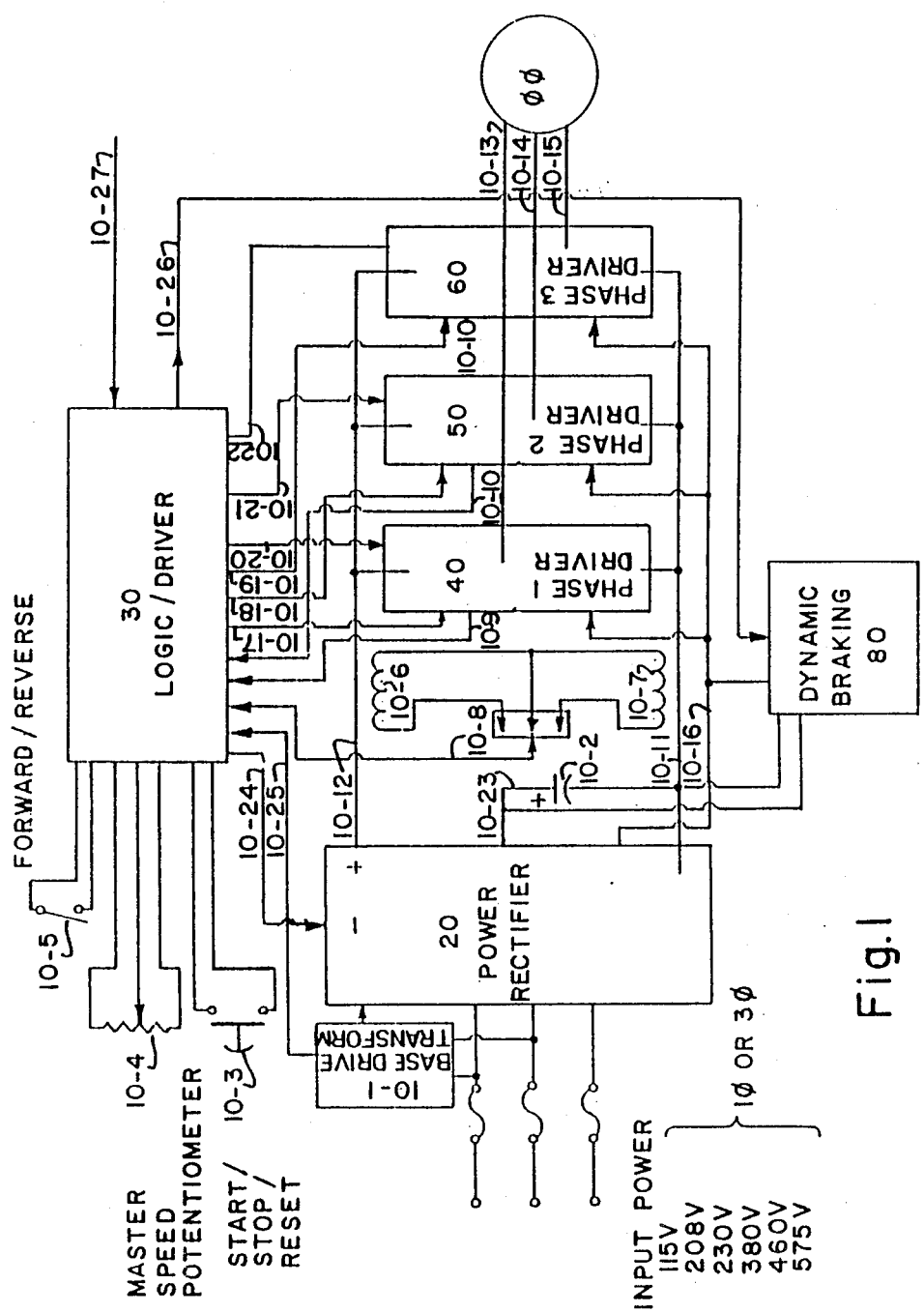

Reference should now be made to FIG. 1 which details out the Block Diagram and Schematic of the AC Motor Speed Controller. Incoming power, consisting of single phase or three phase AC, 115 V, 208 V, 230 V or 380 V enters into the Power Rectifier 20. During power up a pre-charge is applied to Filter Capacitor 10-2 while the main DC Buss 10-12 (+) and 10-11 (−) are applied to Phase Drivers 40, 50, 60. Phase Drivers, at the control and direction of logic/Driver 30 control the Motor 00. The Phase Drivers apply the Frequency and Voltage to the AC motor 00 therby controlling Speed, Torque and Horsepower. Dynamic Braking Module 80, also under the control and direction of the Logic/Driver 30 absorbs the regenerative energy from the Motor 00 during deceleration.

Base Drive Transformer 10-1 is the AC power supply for the low voltage DC power supplies in the Power Rectifier 20 and the Logic/Driver 30. Sensing Devices 10-6 and 10-7 monitor the forward and regenerative current in the main DC buss 10-11/10-12 which are fed back into the Logic/Driver 30.

The Logic/Driver 30 is controlled via operator commands. The Forward/Reverse 10-5, Master Speed Potentiometer 10-4 and Start/Stop/Reset 10-3 are manual control imputs while serial link 10-27 represents an external computer command link.

Figure 2:
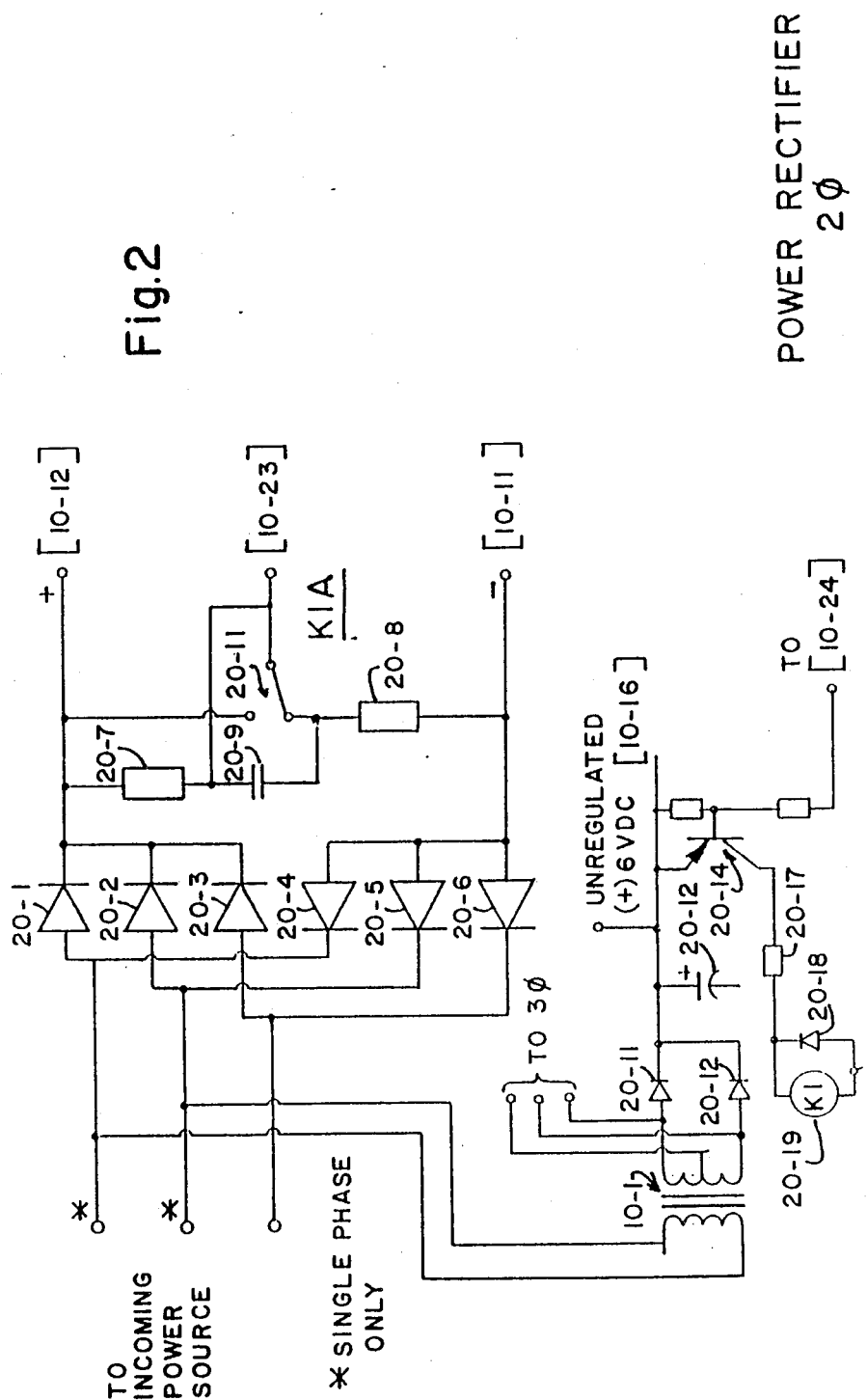

FIG. 2 represents the Power Rectifier Block 20. It consists of four or six diodes (for single or three phase input power) 20-1 through 20-6 which are wired in a full bridge rectifier configuration. Resistor 20-7 acts as a current limiting resistor to precharge Filter Capacitor(s) 10-2 wired into 10-23 and 10-11 when relay contact K1A is in its normal unpicked position as shown. Upon application of main power Filter Capacitor(s) 10-2 begin charging untill approximately 2 seconds have pass at which time a "pick" signal is sent from the Logic/Driver 30 along line 10-24 which turns on PNP transistor 20-14 with limited base drive via resistor 20-16. Transistor 20-14 turns on causing a current to flow via resistor 20-17 to relay coil K1, picking the relay contacts K1A which causes Filter Capacitor(s) 10-2 to be connected directly across the Main Buss 10-11/10-12. Capacitor 20-9 minimizes arking of contacts K1A during the switching period. Diode 20-18 is a flyback diode to clamp the inductive energy of relay coil K1 during turn off. Resistor 20-15 is a base clamp resistor. Diodes 20-11 and 20-12 in conjunction with filter capacitor 20-13 form the unregulated +6 VCD power supply 10-16 which is used to feed the three Phase Modules 40, 50, and 60. Resistor 20-8 is used to discharge the Filter Capacitor(s) 10-2 when the main power is removed and the relay K1 is in its normal un-picked state.

Figure 3:
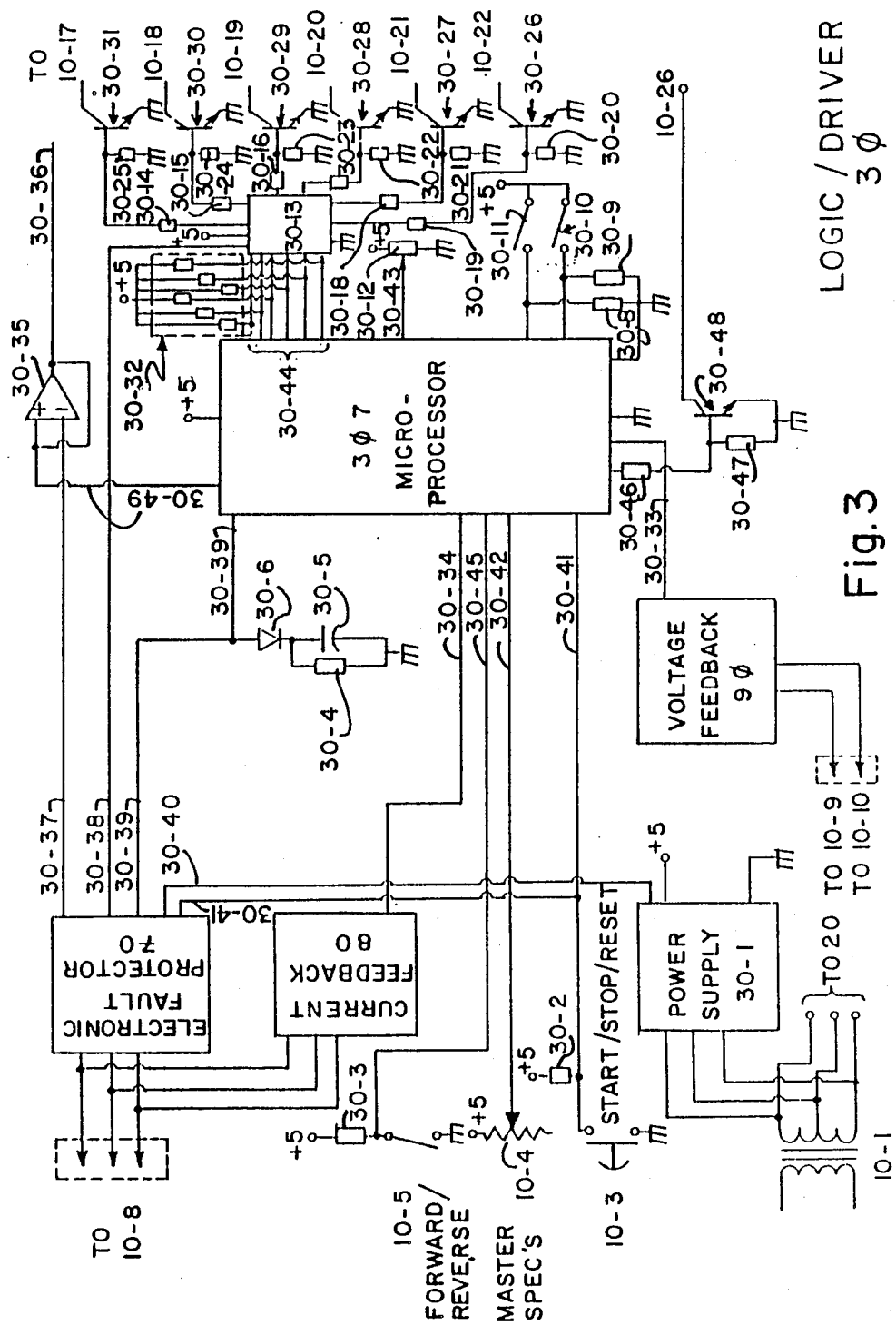

FIG. 3 represents the Logic/Driver 30 section which handles all of the signal commands to run the motor 00 based on operator commands and Motor 00 load conditions. It is the unit which determines operating Frequency (Speed), Output Voltage (Torque) and Horsepower. In addition it protects the AC Motor Controller from overload and fault conditions.

The main controlling element of the Logic/Driver 30 is the Microprocessor 30-7 which has four analog inputs (30-33, 30-34, 30-42, 30-43) and several digital input/outputs. The operating and control elements of the Microprocessor 30-7 are more further defined in Section B (Software) that follows.

The six main output lines 30-44 control the Phase Drivers 40, 50, and 60 via buffer device 30-13 and the six output transistors 30-26 through 30-31. Resistor bank 30-32 acts as a pull up device while resistors 30-14 through 30-19 act to limit base drive to the output transistors. Resistors 30-20 through 30-25 are base clamp resistors.

Switches 30-10 and 30-11 are operator selectable to determine low frequency Voltage Boost settings. Resistors 30-8 and 30-9 act as pull down devices. Low frequency Boost is used to increase voltage applied to Motor 00 at low frequencies (12 Hz and below) which increase Motor 00 torque necessary to overcome Inertia of Motor 00 load, friction of the mechanical system and resistivity components of the Motor 00. The amount of Voltage Boost for a given Frequency and Switch combination (30-10 and 30-11) is predetermined and software controlled.

The four Analog controlling input signals to the Microprocessor 30-7 is as follows: (1) Speed command signal 30-42 which determines the operating speed (frequency) to the Motor 00 (maximum operating speed is software controlled); (2) Acceleration/Deceleration signal 30-43 as determined by operator adjustable potentiometer 30-12 set the rate at which the output frequency to the Motor 00 changes as the speed command 30-42 varies; (3) Voltage Feedback signal 30-33 feds back a analog signal proportional to the actual output voltage to the motor 70; (4) Current Feedback signal 30-34 feds back an analog signal proportional to the current in Motor 00.

Start/Stop/Reset command signal is given by operator control push button 10-3 inputting a digital signal 20-41 into the Microprocessor 30-7. 30-2 is a pull up resistor. Signal 30-41 is also used to rest Fault Protector 70.

Forward/Reverse command signal is given by operator control switch 10-5 inputting signal 30-45 into microprocessor 30-7. Resistor 30-3 acts as a pull up resistor. Dynamic Braking Signal is generated out of the Microprocessor 30-7 via current limiting resistor 30-46 turning on transistor 30-48. 30-47 is acting as a base clamp resistor. The Dynamic Braking Signal is a pulse width modulated (PWM) signal, where a high (or 1 equiv.) turns on transistor 30-48 causing the Dynamic Braking section 80 to turn on absorbing energy from the main buss 10-11/10-12. The Dynamic Braking provides a constant torque braking and therefore the PWM duty cycle is predetermined and proportional to the selected deceleration rate. The faster the rate of deceleration the larger the duty cycle (percentage of a high output over the entire period) and therefore the greater the absorbed energy via section 80. The slower the rate of deceleration would result in a smaller duty cycle.

The Reset line 30-39 enables (if high) or disables (if low) the Microprocessor 30-7. During initial power up, a charge current is generated from the Microprocessor 30-7 into line 30-39 charging capacitor 30-5 via diode 30-6. Upon reaching a full charge level, Microprocessor 30-7 begins operation. Should a fault occur via an overload detectded by the Electronic Fault Protector 70, line 30-39 goes imediately to zero . Diode 30-6 acts as a blocking diode so that the charge on capacitor 30-5 does no slow down the zero going signal from the Fault protector 70. This allows the Microprocessor 30-7 to immediately shut down. During a "fault" condition, resistor 30-4 discharges capacitor 30-5.

Voltage comparator 30-35 is used as a latch device upon inital power up. Line 30-37 is a fixed voltage reference to comparitor 30-35. Upon application of power to the Logic/Drive 30 line 30-49 is high. Approximately two seconds later 30-49 goes low causing the output of the voltage comparitor 30-35 to go low latching up, via feedback, to the non-inverting input of 30-35. Output signal 30-36 is then sent to the Power Rectifier 20.

Figure 4:
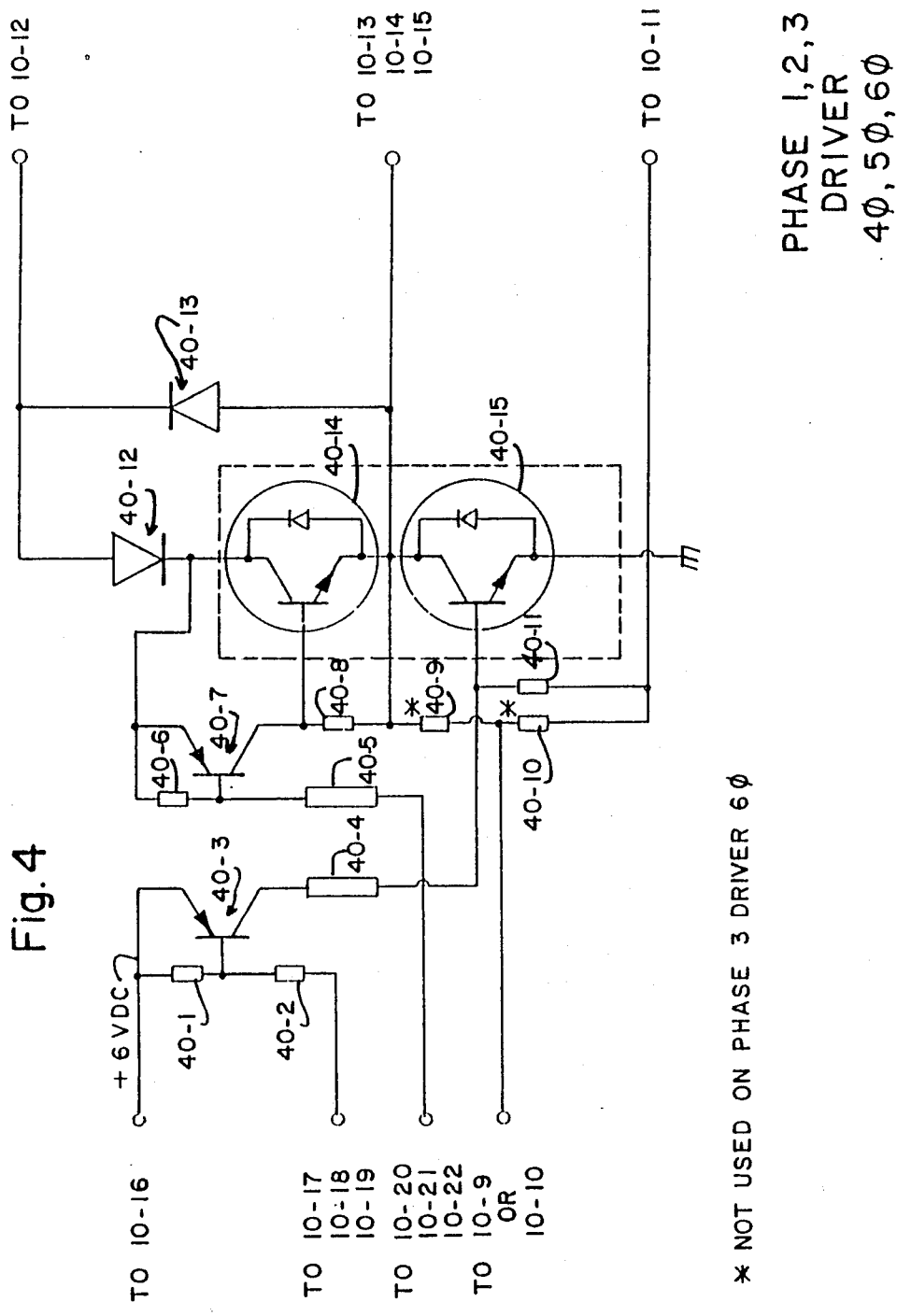

FIG. 4 represents the Phase Drivers 40, 50, and 60. All three Phase Drivers are identical with the exception of resistors 40-9 and 40-10 which generate a voltage feedback signal off of Phase Driver 40 and 50 via line 10-9 or 10-10. These two signals feedback to the Logic/Driver 30 (Voltage Feedback section 90) to generate an error signal which represents the output voltage applied to Motor 00.

The Phase Drivers operate as follows: Two input signals generated from the Logic/Driver 30 enter in via lines 10-17,10-18, and 10-19 for the negative Pulse Width Modulation (PWM) drive and 10-20,10-21 and 10-22 lines for the Positive Toggle Drive.

When the 10-17 through 10-19 lines go low they drive transistor 40-3 via base limiting resistor 40-2 in saturation causing current to flow via resistor 40-4 turning on the main Darlington Power Transistor 40-15 also into saturation. Resistors 40-11 and 40-1 are base clamp resistors. Upon turn of on 40-15 current begins to flow through Motor 00 via negative buss line 10-11 and lines 10-13,10-14 or 10-15. Concurrently, one or two of the other Phase Modules are in a Positive Toggle drive (reference FIG. 10 for timing conditions). During this the Positive Toggle drive is high (off). The rate of PWM and duty cycle is dependent upon operating speed, line voltage and load conditions. It is determined and controlled by the Logic/Driver 30.

Figure 10:
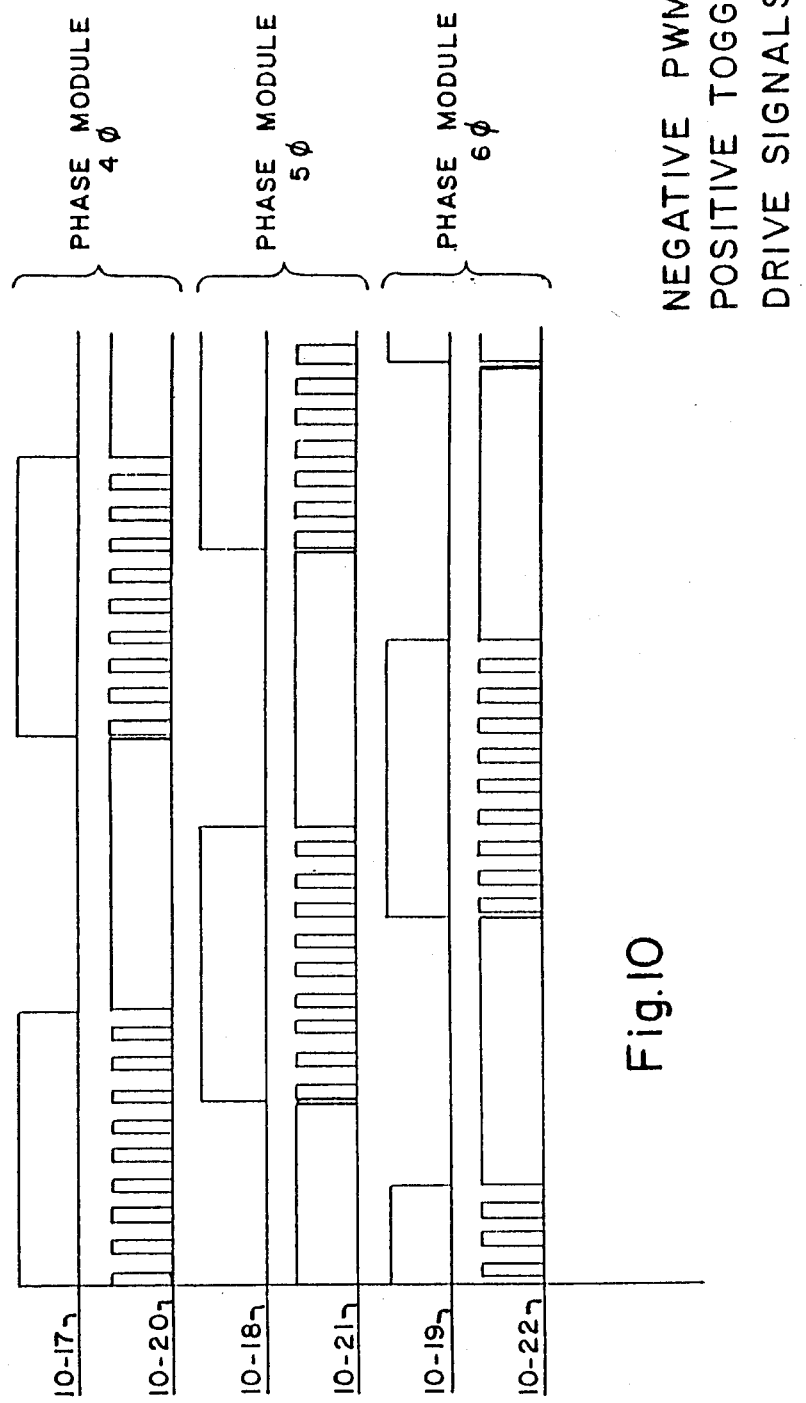
Figure 12:
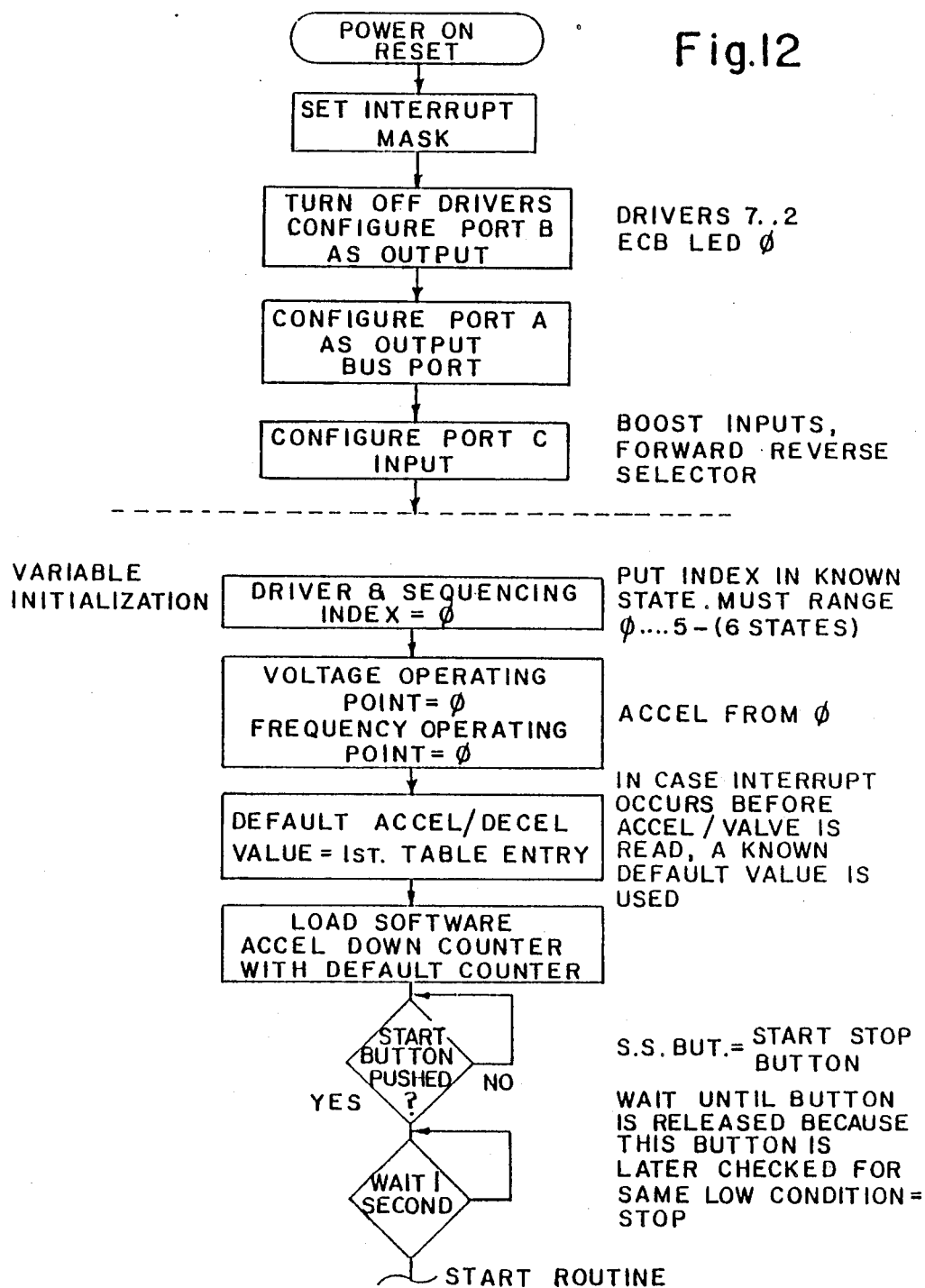
Figure 13:
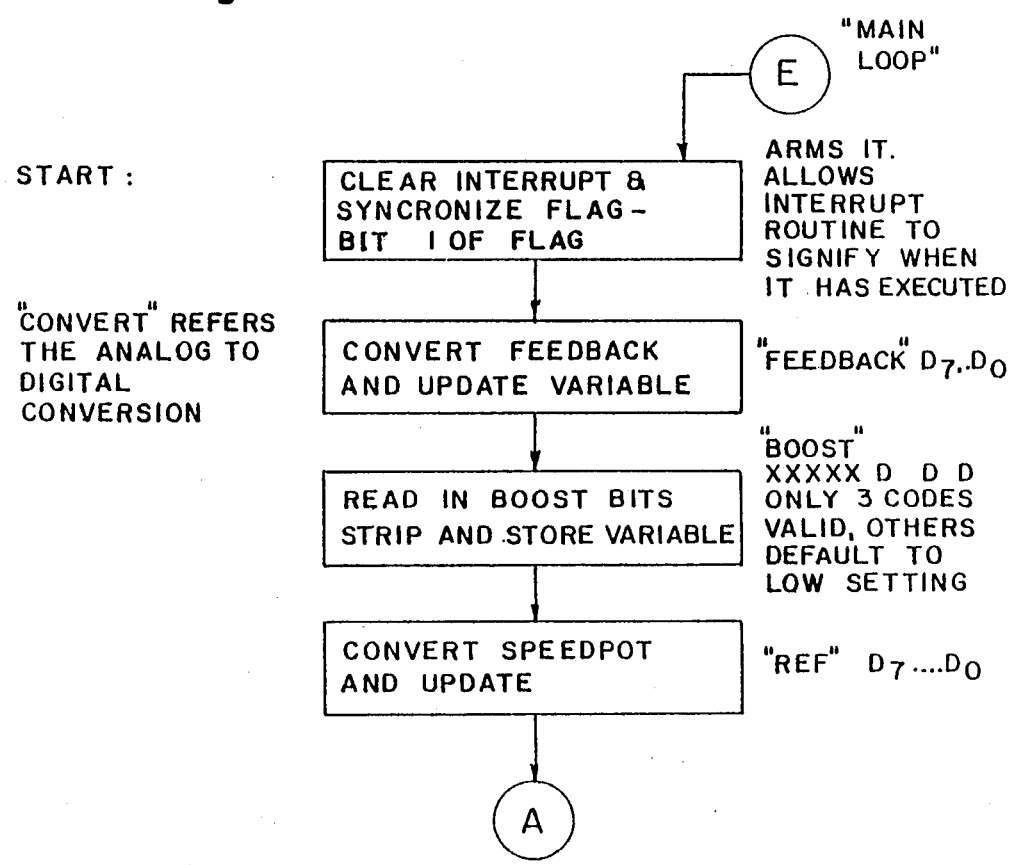
Figure 14:
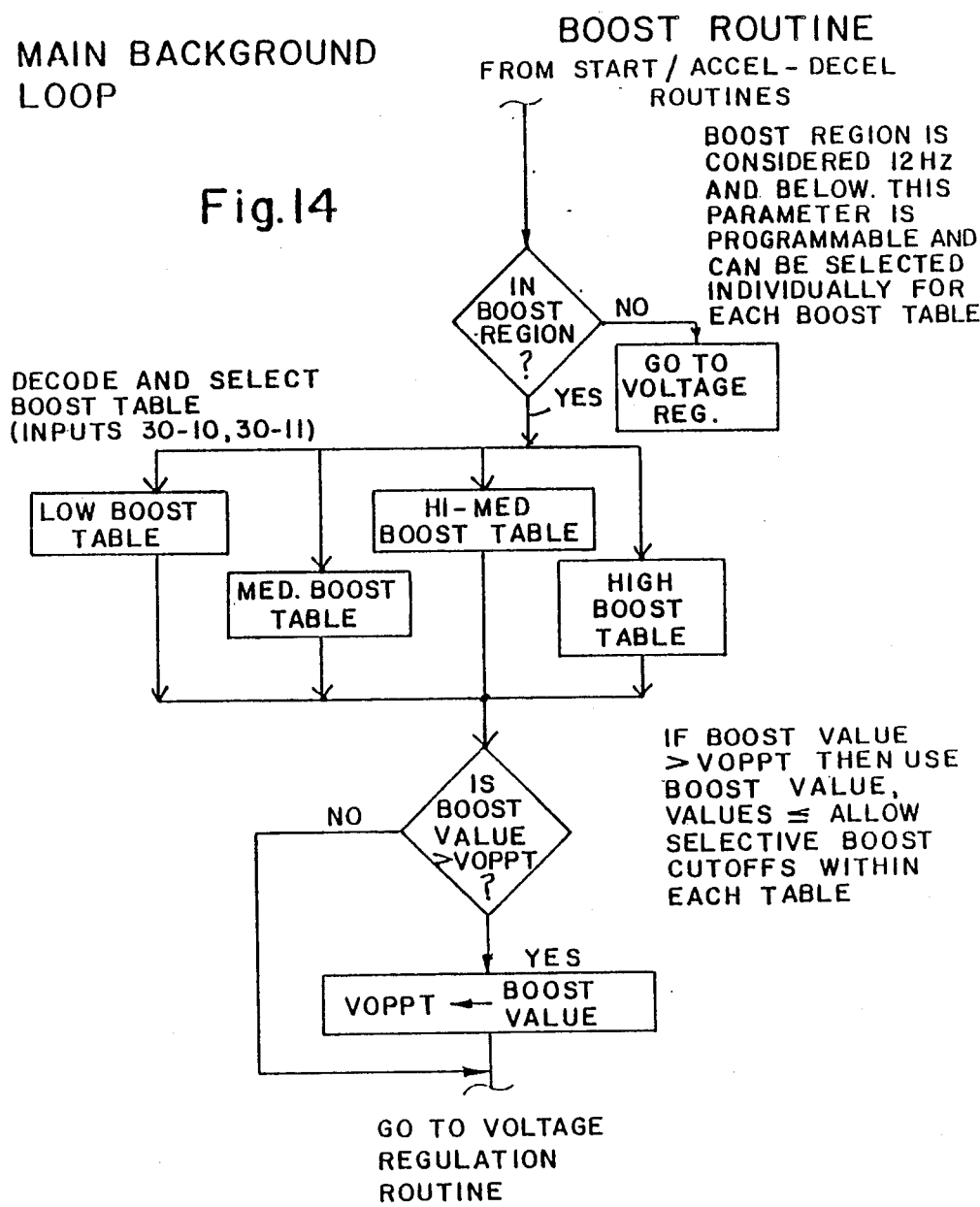
Figure 15:
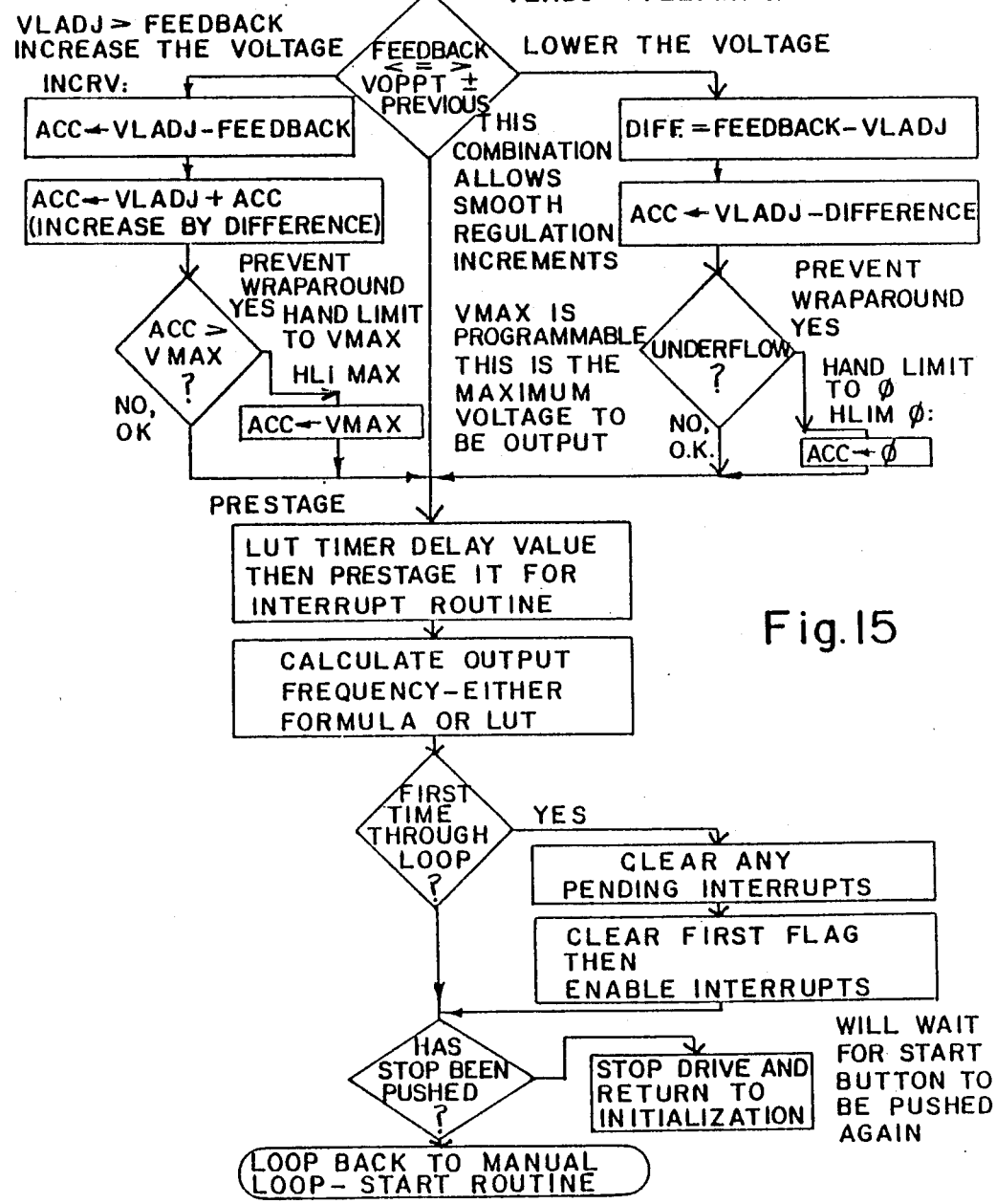
Figure 16:
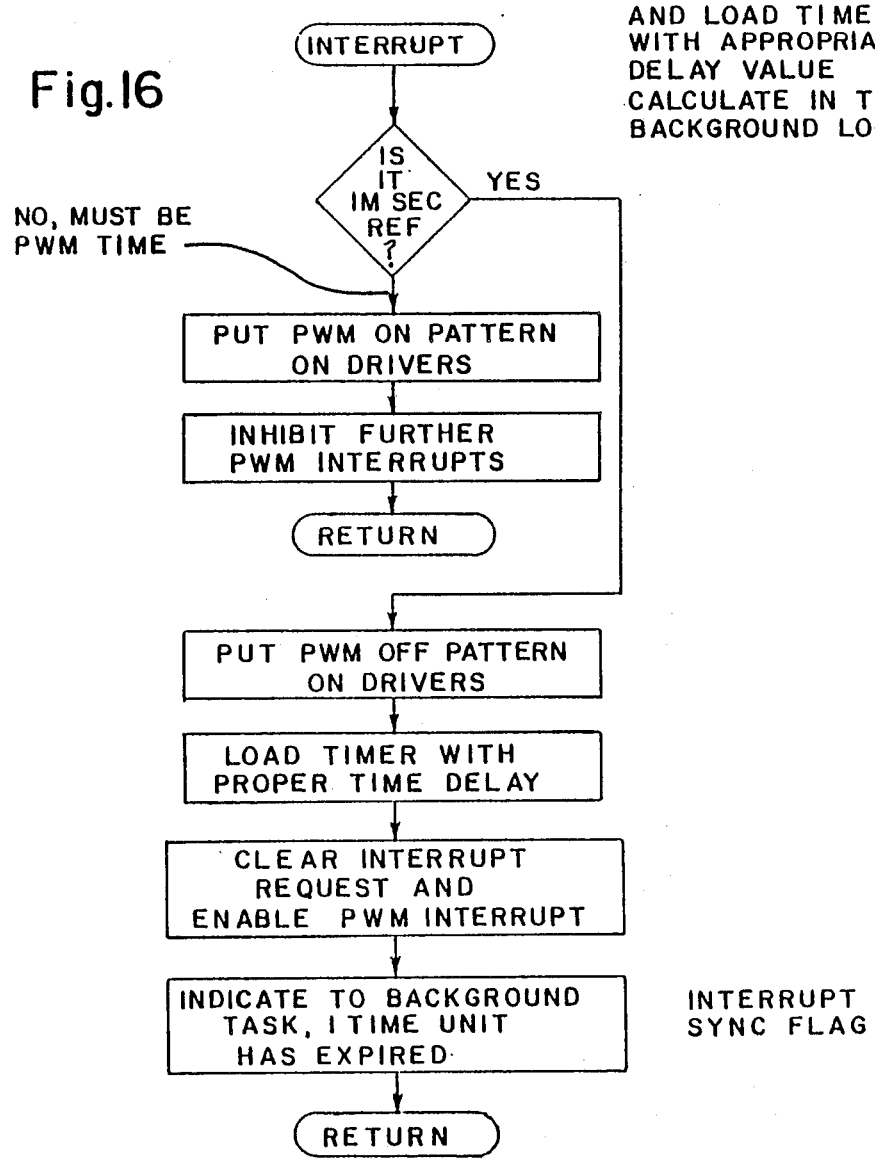
Figure 17:
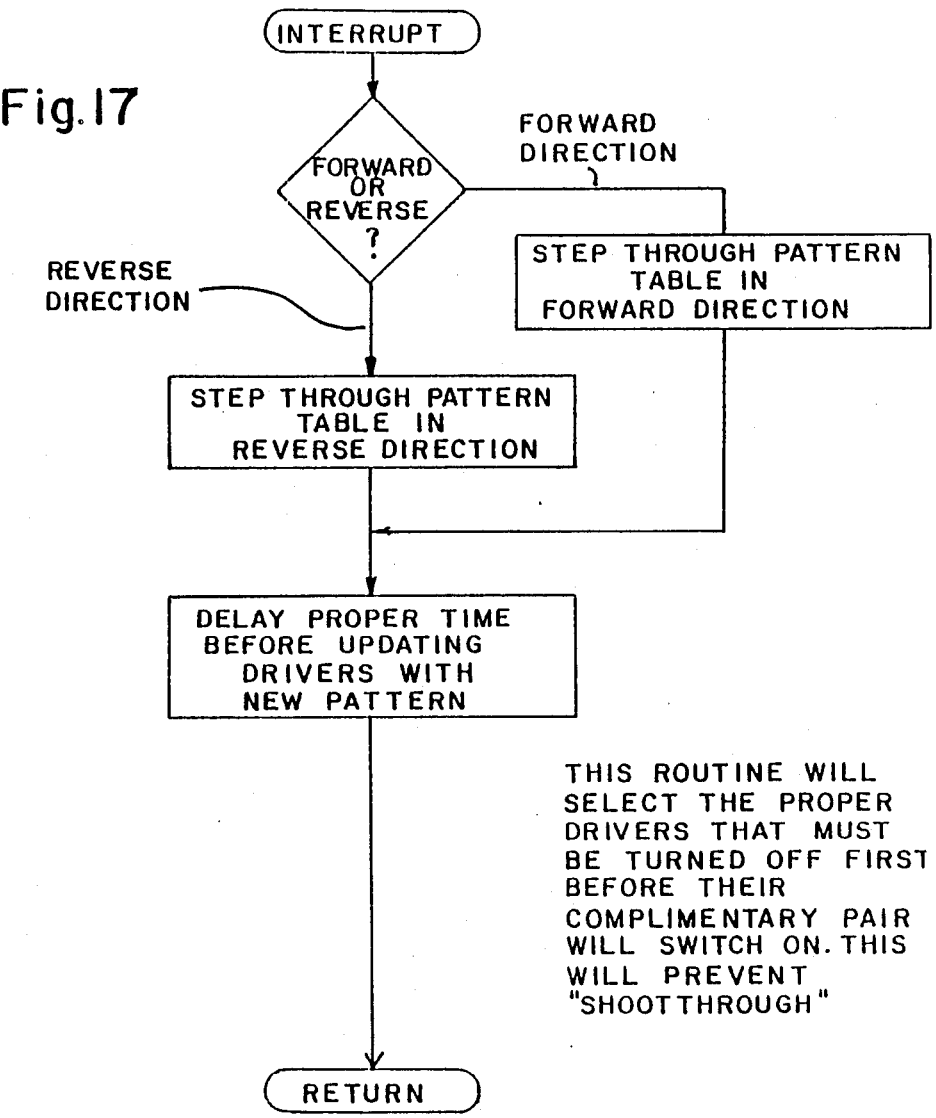
Figure 18:
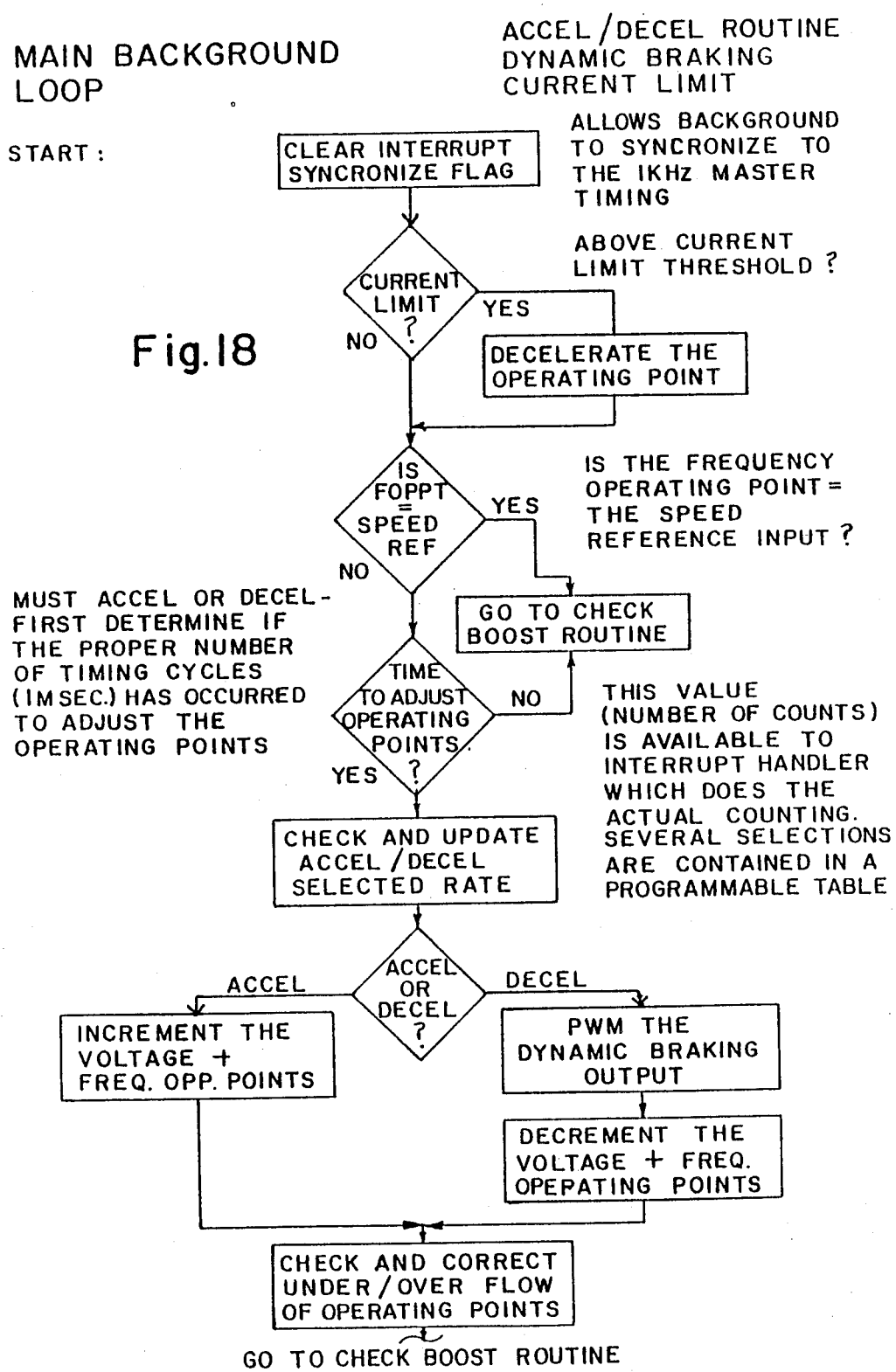

Based on operating speed requirements the Logic/Drive 30 will casue a particular Phase Module to change state. The Logic/Driver 30 would remove the negative PWM drive (10-17,10-18 or 10-19) wait a short period (approximately 150 microseconds) and then apply a Positive Toggle drive (low) (Ref. FIG. 10). When this occures the high voltage PNP transistor 40-7 turn on into saturation via base drive resistor 40-5 turing on its paired darlingtion Power Darlington Transistor 40-14. Resistors 40-6 and 40-8 act as base clamp resistors. Diode 40-12 is used to block any regerative energy flowing from Motor 00 when transistor 40-15 is turned off. This forces the inductive energy through fast recovery diode 40-13. This allows for the operation of transistor 40-14 without negative base drive. Snubbing device may be necessary across transistors 40-14 and 40-15 depending upon devices specifications.

Figure 5:
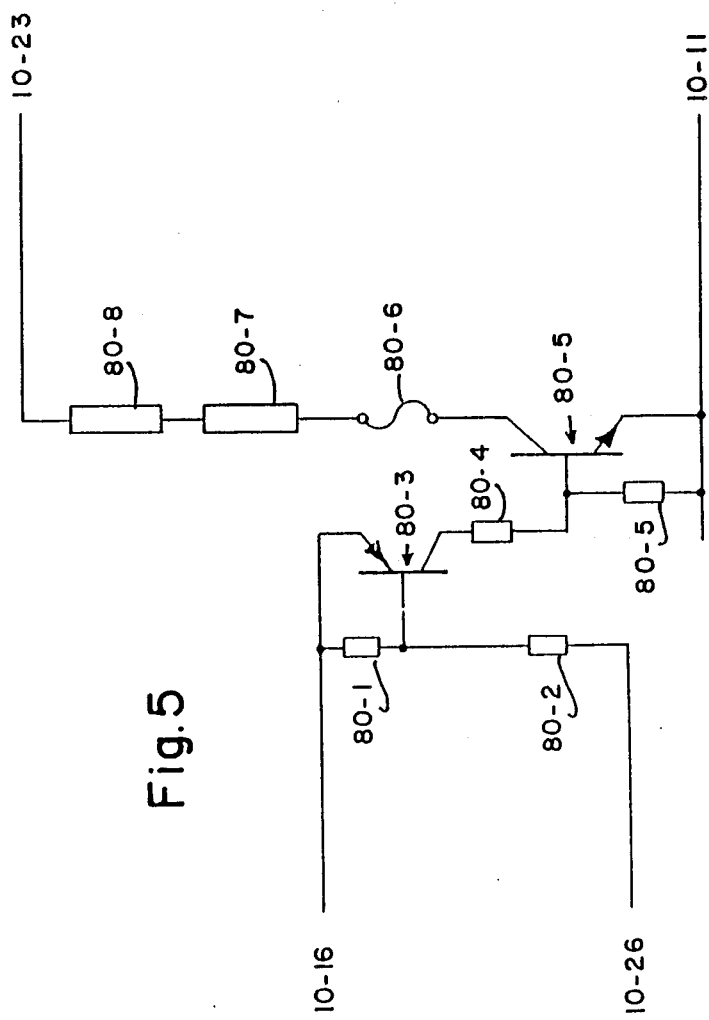
Figure 6:
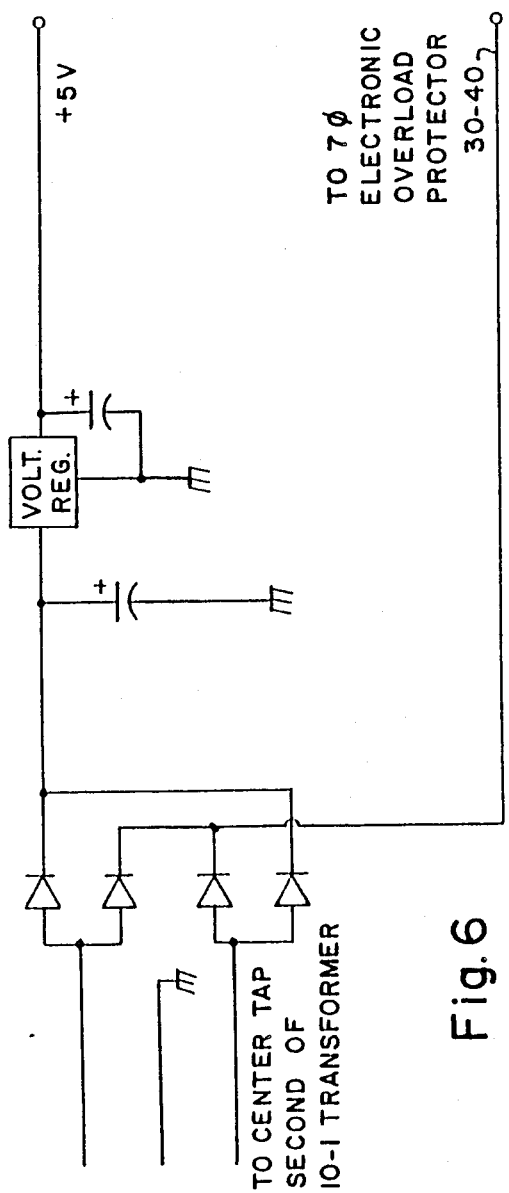
Figure 7:
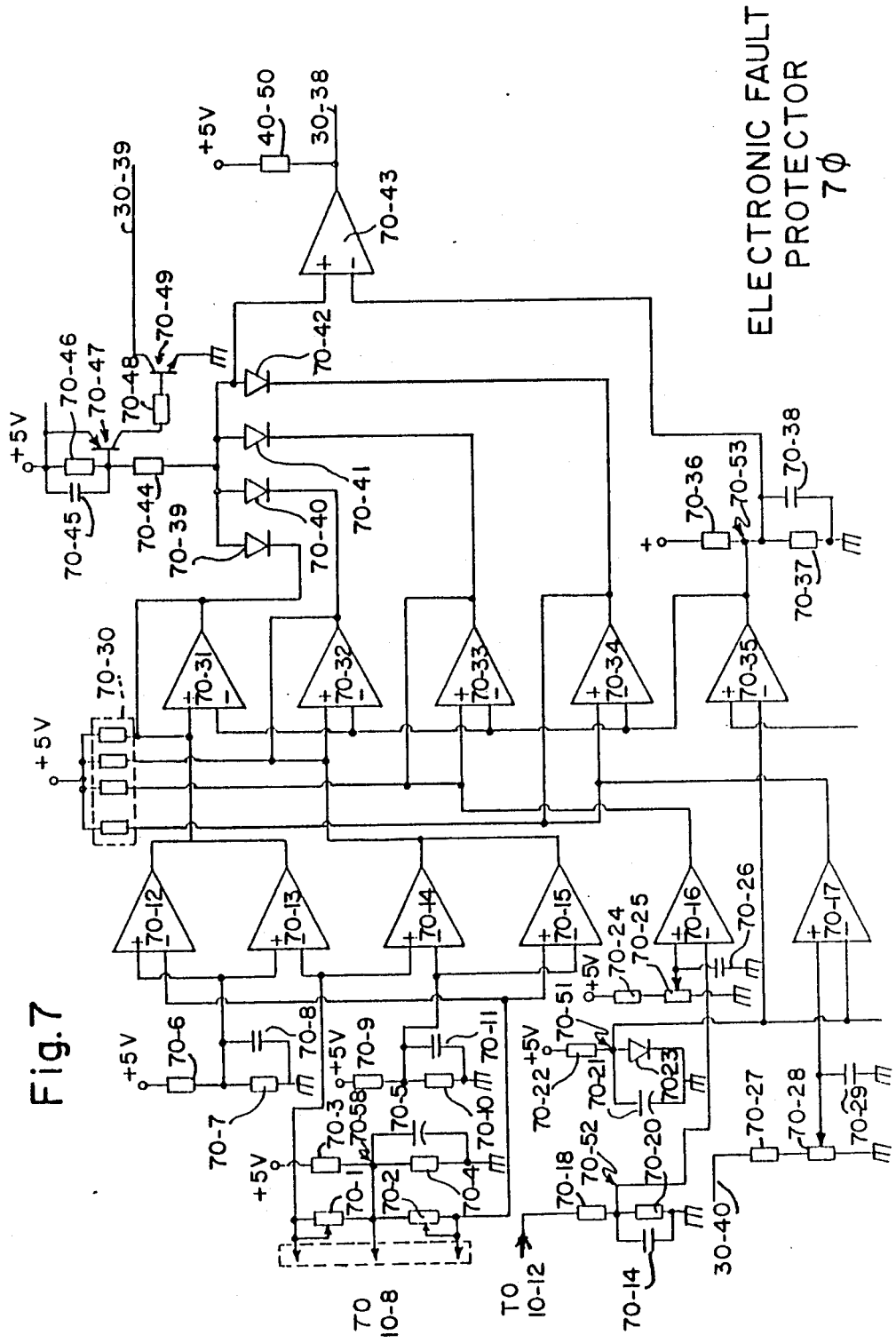

FIG. 5 represents the Dynamic Braking section, where line 10-26 feeds from the Driver/Logic 30 a Pulse Width Modulation signal as described earlier. Upon line 10-26 going low transistor 80-3 turns on into saturation via base limiting resistor 80-2 causing current to flow via base resistor 80-4 turning on Darlington power transistor 80-5 into saturation. Resistors 80-1 and 80-5 act as base clamp resistors. Saturation of 80-5 causes main buss (10-11 and 10-23) current to flow thorugh high wattage dump resistors 80-8 and 80-7. The rating of the dump resistors are such that they are well below required levels since a full 100% duty cycle is never applied. The Dynamic Braking PWM signal is proportional to the deceleration rate, that is, the shorter the deceleration rate the high the duty cycle, and therefor an equal amount of energy is always absorbed or "dumped" during a braking cycle. Failure of 80-5 or a high repeatitive decleration condition will cause fuse 80-6 to clear preventing damage due to overheating of dump resistors 80-7 and 80-8.

Figure 8:
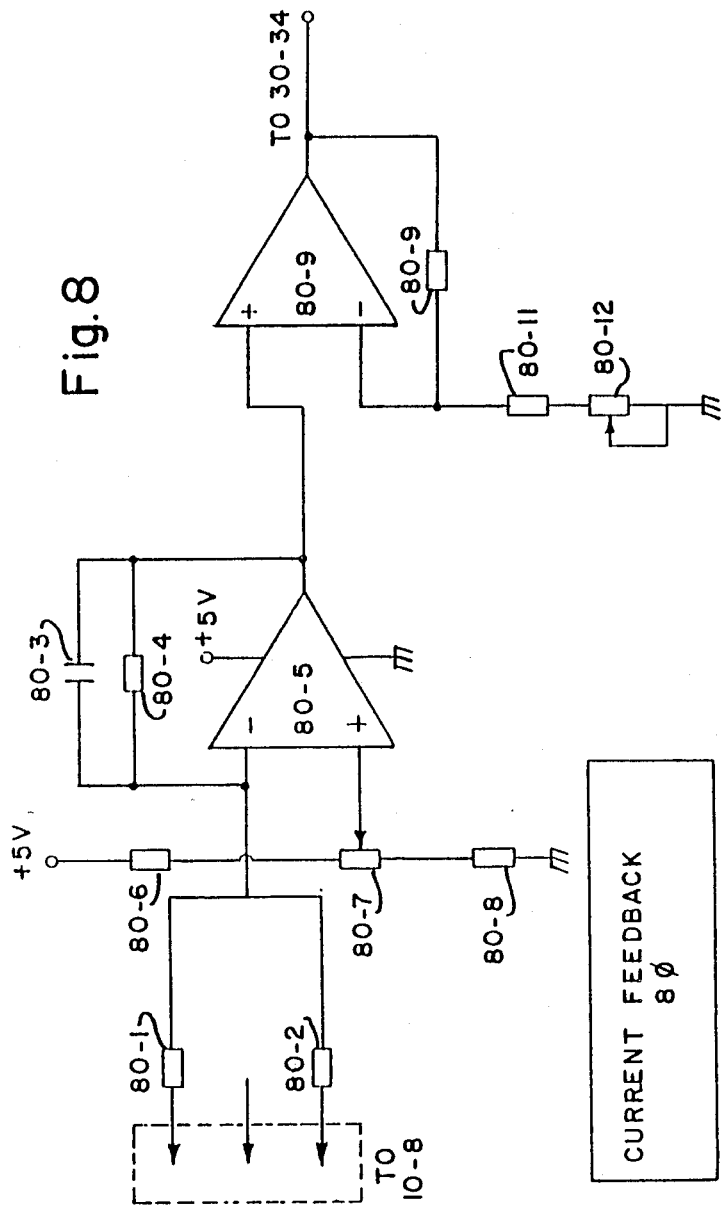

FIG. 8 represent the Electronic Fault Protector. It consits of four independent trip condtiions indicated by four LEDs (70-39 through 70-42). The two buss current sensing devices 10-6 and 10-7 monitor forward and regenerative currents on the main buss 10-11 and 10-12. These two independent signals are refereneced to 70-50 (2.5 volts) which is developed by voltage divider resistors 70-3 and 70-4. Potentiometers 70-1 and 70-2 allow for fine adjustment and calibration of current sensing signals. These current signals then enter voltage comparitors 70-12 through 70-15 whose output is high (open collector output devcice) via pull up resistor pack 70-30. Resistors 70-6 and 70-7 form a voltage divider which is referenced to 70-12 and 70-13. The voltage at this point is positive with respect to 70-50 (approx. 4.0 volts) which represents the regenrative buss current trip level from sensing devices 10-6 and 10-7. Resistors 70-9 and 70-10 act similar to the above mentioned except that their voltage divider level is negative with respect to 70-50 which represents the forward buss current trip level. Together these two levels form a operating window for normal buss currents. If they are exceeded the output of the respective voltage comparitor will go low.

Over voltage protection is achieved via voltage comparitor 70-16. Resistors 70-18 and 70-20 form a voltage divider off of the main buss voltage. Under normal conditions the output of 70-16 is high. If voltage level 70-52, representative of the main buss voltage, exceeds a preset level as determined by potentiometer 70-28, 70-17 will go low.

Under voltage (low line) protection is achieved via voltage comparitor 70-17. Resistor 70-27 and potentiometer 70-28 form an adjustable voltage divider. The unfiltered full rectified signal 30-40 divided down and filtered by capacitor 70-29. It is adjusted and preset against voltage reference 70-51. Should the preset level fall below the reference 70-51 comparitor 70-17 will go low from its noramlly high state.

Upon detection of a fault condition a latch and shut down of the fault and drive outputs must occur. This is accomplished via voltage comparitors 70-31 through 70-34. All are referenced to 70-53 which is to be the established voltage divider made up of resistors 70-36 and 70-37. If anyone of the four fault detector comparitors goes low (two sets of two are tied together) their respective follower comparitor (70-31 through 70-35) non-inverting inputs will be set low below voltage reference 70-53. This will cause their normally off output to turn on bringing the output low and latching the fault condition. In addition, one of four indicating LED's 70-39 through 70-42 will illuminate indiciating which fault has occured. The illumination of the LED's will cause transistor 70-47 to turn on via base resistor 70-44 which turns on transistor 70-49 via base resitor 70-48 bringing line 30-39 low causing Microprocessor 30-7 to reset. Concurrently comparitor 70-43 whose output is high during a normal condition will toggle line 30-38 low turning off the outputs of buffer device 38-13. Reset of the latches is accomplished via voltage comparitor 70-35 whose inverting input is referenced to 70-51 and having a normal output of off. When line 30-41 is low from a manual reset of button 10-3, 70-35 output turns on pulling reference 70-53 to circuit common causing all latch comparitors 70-31 through 70-34 to unlatch unless a fault conditon still exists. Capacitors 70-5, 70-8, 70-11, 70-19, 70-26, 70-29, 70-38 and 70-45 are noise protection capacitors.

The direct coupling of this circuit to the Microprocessor 30-7 and the output buffer 30-13 allows for quick shut down of the AC Motor Controller within approximately 10 usec. whenever a fault condition occurs.

FIG. 8 represent the Current Feedback section 80 shown in Logic/Driver 30. Signals from the Buss current sensing devices 10-6 and 10-7 are feed into 80-1 and 80-2 resistors which input into summing operational amplifier 80-5. The gain of the amplifier is set by resistor 80-4 so that under maximum conditions the 80-5 will not saturate. Filtering is done by capacitor 80-3. The non-inverting input of 80-5 is offset by potentiometer 80-7 and adjusted in such a manner as to have zero output voltage on 80-5 with no main buss current frlow on 10-11 and 10-12. The output of 80-5 is then inputted into non-inverting input of operational amplifier 80-9 which is wired as a non-inverting amplifier utilizing resistors 80-10, 80-11 and 80-12 to set the gain. Potentiometer 80-12 is adjusted such that at desired current to be limited at Motor 00, 80-9 output voltage would be equal to 2.0 volts and is applied to Microprocessor 30-7 via line 30-34.

Figure 9:
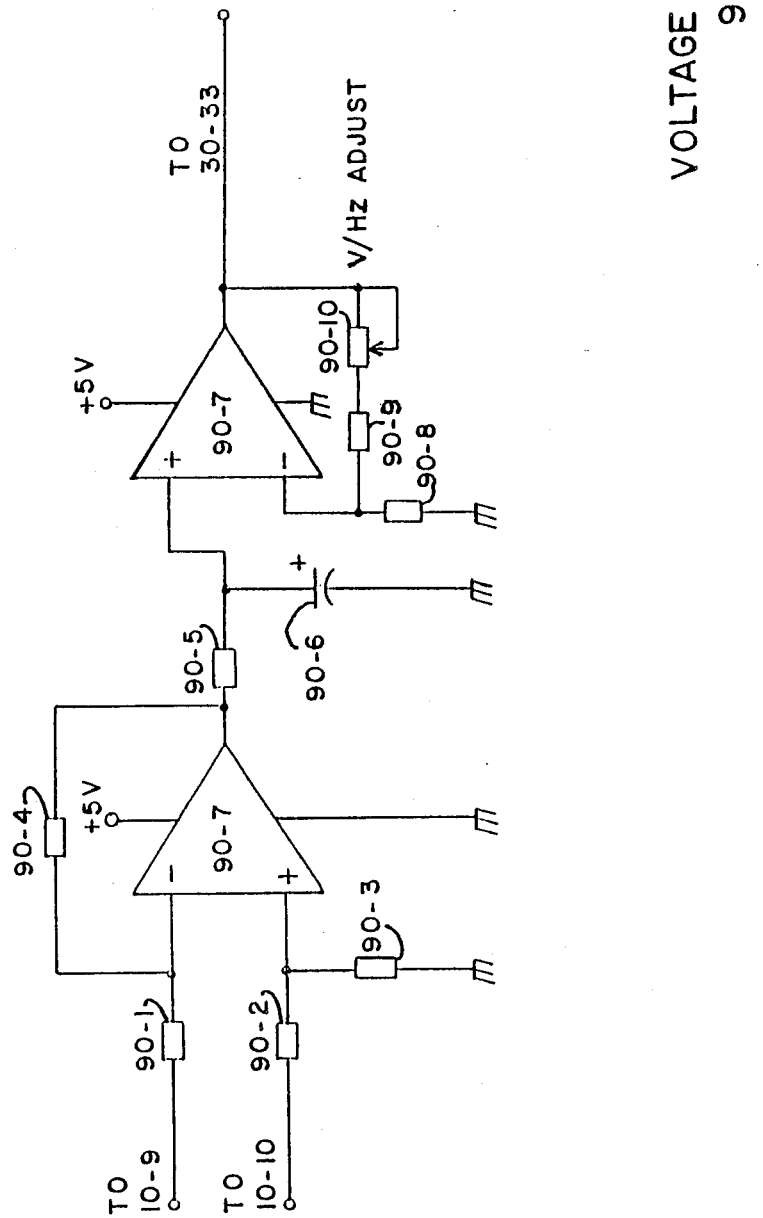

The Voltage Feedback section 90 of the Logic/Driver 30 is represented by FIG. 9. The two feedback voltage signals generated off of Phase Modules 40 and 50 from voltage divider resistors 40-9 and 40-10 on lines 10-9 and 10-10 are applied to operational amplifier 90-7. 90-7 is wired as a differential amplifier via resistors 90-1 thorugh 90-4. It output is applied to low pass filter made up of resistor 90-5 and capacitor 90-6 and applied to operational amplifier 90-7 which is used as a non-inverting amplifier. The gain of 90-7 is controlled by resistors 90-8, 90-9 and 90-10. Potentiometer 90-10 acts as a Volts per Hertz adjustment and is calibrated for nominal operation at 30 Hz Motor 00 frequency to be 1.93 Volts. The output is applied to Microprocessor 30-7 where the signal is software linearized.

(B) SOFTWARE - General Description

The logic/Driver 30 consists of several major functions or tasks; they are:

1. System initialization
2. Acceleration/Deceleration rate control and selection
3. Dynamic braking control and selection
4. Current limit control
5. Frequency control and selection
6. Regulated voltage control and selection
7. Boost voltage control and selection
8. Serial communications channel
9. Stand alone operator control or remote control via serial channel
10. Start/Stop Control
11. Electronic Fault Protection control
12. Forward/Reverse direction and selection, both static and dynamic These functions are logically organized into the following software structures:
a. Initialization code
b. Main Control loop/command interpeter
c. Regulated voltage (PWM) timing interpeter handlers
d. Output frequency timing interrupt handler
e. Electronic Fault Protection interrupt In general, the software will continuously execute within the main control loop/command interpreter once the system has been initialized and "started". All time critical functions, namely the Regulated Voltage Control Timing, Output Frequency Timing and Electronic Circuit Breaker functions are handled within separate interrupt handler tasks. This organization ensures simple, highlevel control while maintaining accurate timing functions.

The extensive use of look up tables and programmable parameters allows the basic algorithm to be optomized to a particular motor without modification of the algorithm itself.

System Initialization-General

The system Initialization Function will configure and initialize all hardware that is under contrrol of the Logic Driver. In addition, software variables are initialized, initial commands are received and various control inputs are measured. This routine is exercised anytime that a power-up of the device occurs or an Electronic Fault Protection [EFP] interrupt occurs.
Control Inputs: Start/Stop/Reset
Start/Stop/Reset: 10-3
Reset/EFP input signal: 70

Serial Channel

The Serial Channel will provide a networking capability, so that various systems may be realized efficiently. Digital Ratioing is a prime candidate.

Acceleraton/Deceleration-General

Acceleratoin/Deceleration is obtained by creating an aritificial operating point and then incrementing/decrementing this operating point towards the desired operating speed. The speed signal is control input 10-4. Each interval movement takes a programmable number of time units to complete. A selection of preprogrammed values are available either through the serial channel or the accel/decel control input 30-12. In this way, the acceleration/deceleration time constant may be controlled.

Dynamic braking occurs only during deceleration and provides a variable duty-cycle signal that engages circuitry to dissipate energy stored in large inertia loads.

Decerlration will occur whenever the unit is in current limit mode. This current limit control is 30-34.

Boost-General

The Boost function will provide a greater than nominal volts/hertz curve overthe low speed region of the drive to provide adequate break-away torque. There are several preprogrammed tables which may be selected with inputs (30-10 and 30-11). The boost voltage replaces the nominal voltage operating point over the boost range. The frequency remains the same and thus torque is increased.
Boost control selects: 30-10, 30-11

Voltage Regulation-General

Inputs: Feedback control input 30-33
Output: PWM duty cycle on Pase Driver outputs 30-13

The voltage regulation routine executes everytime through the main loop. The main loop will measure voltage regulation error and determine the correct PWM interrupts handler to implement. Regulation is maintained around the voltage operating point. The voltage feedback signal may be passed through a look-up table, in order to linearize and expand its dynamic range. Next this value is compared gainst the voltage operating point and a difference is obtained. This difference is reflected in the PWM duty cycle in order to obtain voltage regulation.

This value is pre-staged for the interrupt handler.

Output Frequency is generated with a six phase waveform. The frequency generator uses a precise time sourse that runs at 6 times the nominal frequency. The frequency interrupt handler will change the drivers sequence patterns appropriately. These pattern may be accessed in either a "forward" or "reverse" manner.

PWM Interrupt Handler

This interrupt will actually provide the timing functions for voltage control. It turns the proper drivers off when the master timing clock (PWM frequency) occurs. It then takes the pre-staged, calculated voltage time delay value and loads a timer with the time delay. When this timer times out, the drivers are turned on for the remaining portion of the cycle. This routine will indicate that 1 unit of the master timing clock has occurred to the background loop as well, since the cycle frequency always remains constant.

Frequency Handler Interrupt

This routine will count the six times frequency clock and then sequence the Phase Driver modules through the 6-step waveform (normal PWM interrupt cycles occur simultaneously). The sequence will either progress in the forward or reverse directions. Whenever the drivers are esquenced a time delay (anti-shoot through) is provided for the drive modules.(30-13)

EFP Interrupt Handler

This handler will immediately turn off all the drivers and reset the processor. The processor maintains a history of EFP occurances, so that many possible recovery schemes may be implemented.

APPENDIX A

System Initialization-Implementation

Flow Charts A and B

The system initialization function configures all hardware that is under control of the logic driver. This includes the various internal/external input/output ports (both analog and digital) hardware timers, serial channels (not implemented in this configuration). In addition software variables are initialized, including the voltage and frequency operating points, acceleration/-deceleratoin default values and driver sequence index.

After the various flags and variables are initialized the unit will go into a loop which waits for the start button, 10-3, to be pressed. This button is dual function in that its meaning is toggled form start to stop to start depending upon the running state of the motor controller. After the unit has "started", a 1 second delay is provided to allow the start button to be returned inactive. Start will always delay 1 second and then provide 1 second delay before the unit returns to the start loop.

After the 1 second delay various control inputs are measured and their initial values stored. These control inputs include: the accel/decel selection, 30-12; voltage feedback input, 30-33; boost value selection, 30-10 and 30-11; for/reverse direction selection, 10-5; master speed potentiometer input, 10-4; and the current limit input, 30-34.

Accel/Decel-Implementation

Flow Chart C

Acceleration/deceleration is obtained by creating and maintaining two artifical operating points; one for voltage and one for frequency control. Separate voltage and frequency operating points are maintained so that alternative voltage/freq curves can be implemented, such as those in the low and boost region. Except for the boost region these operating points will move in unison, so that a nominal volts/hertz curve can be maintained. These points represent the actual operating speed of the drive. As such, voltage regulation is referenced to the voltage operating point. The accel/decel input will choose from several preprogramed rates. The basic time unit used is the PWM period, 1 msec. in this particular implementation.

Dynamic braking is activited whenever the unit is decelerated. Within the deceleration routine is the logic to PWM the dynamic braking output by counting 1 msec. time units.

Within the acceleration/deceleration routine is the current limit function. The unit will limit the current drawn by decelerating and lowering the speed temporarily. It does this by detecting the threshold window on control input 30-34, and then forcing the unit to decelerate until the current is at a safe level.

Boost-Implementation

Flow Chart D

The Boost Region is defined as below 12hz running frequency. Within this region are 4 tables with programmable voltage values. The routine will first detect whether it is within this 12hz boost region. (The region value is programmable as will). If it is, then the chosen table is selected and its voltage values are indexed by the operating frequency value. The boost value is compared to the voltage operating point. The voltage operating point is replaced if the boost value is greater. In this way each table may have a different programmable frequency relative to the other tables.

Voltage Regulation-Implementation

Flow Charts E and F

The output voltage is regulated by varying the driver PWM duty cycle on a 1 msec. (1 cycle) basis. The implementation uses the voltage operating point (voppt) as the reference voltage and converts (A and D conversation of feedback) signal. This signal is "linearized" by use of a look up table). An offset value (up-down counter) is incremented/decremented in the proper direction and then added/subtracted to the voltage operating point value. This new value is the actual value to be used for the PWM duty cycle. This method allows smooth adjustments, little or no oscillations. In addition a sample counter can easily be incorporated which allows the updating of the voltage correction to be calibrated to a particular motor.

Once the correct PWM value has been determined the actual time count of the duty cycle is obtained from a look-up table and prestaged for the timer interrupt handler. Likewise the selected output frequency indicated by foppt will index a look-up table and load the frequency timer with the correct count for 6 times running frequency.

The interrupts are not enabled until the first pass through the loop has occured. This will allow the prestaged values to be computed and stored prior to interrupt activity.

The stop button (start button once the unit is running) is examined every time through the main loop and the unit is stopped( all control outputs to drivers are turned off, interrupts are disabled) if so selected.

PWM Voltage Control Interrupt Handler

Flow Chart F

The timing of the 1 msec PWM cycle is maintained by a timer and as interrupt handler, optimized for speed. The algorithm will turn off the proper drivers with the driver sequence patterns when a 1 msec interrupt has occurred. This 1 msec time source is also used as as internal time base for accel/decel timing and main loop control. A interrupt sync flag is toggled by the background tasks and the interrupt handler upon 1 msec occurances. The routine will also load the voltage timer either the PWM duty cycle count calculated and prestaged by the background.

Once the voltage timer has timed out, the drivers are turned on with the proper patterns and further timer interrupts are ignored until the 1 msec reference.

Frequency Control Interrupt Handler

Flow Chart G

The frequency interrupt will step through and select the driver patterns necessary for the 6 step waveform. This waveform may be sequenced in a forward of reverse direction. The direction indication may be either static, that is determined only once when the unit has started. Dynamic direction change involves decelerating the motor to zero speed, toggling the direction and then accelerating to the previous operating speed. Whenever the 6 step waveform sequence is changed, 1 complement pair of Phase Drivers has the danger of shootthrough (both transistors on for a brief period). The interrupt handler will delay the appropriate amount (programmable for different transistors) of time to avoid this condition by ensuring that 1 transistor has turned off before the other transistor has turned on.

Electronic Fault Protection-Implementation

The electronic fault protector interrupt will actually activate the microprocessor's reset line, thus causing a system reset. The initialization routine will detect previous activity by checking for several specific values in several specific places. This detection will allow algorithms to be developed which modifies how the unit will restart itself due to previous history. For instance, the unit may restart itself three times before it indicates a serious problem.

We claim:

1. In a speed and torque controller for an AC motor having at least one winding and wherein power from a source of high DC voltage power is applied to the winding through power switches whose conduction intervals are controlled by pulse duratoin variable pulses with the power switches coupled to the winding and with the enabling of the power switches being controlled by a square wave whose frequency is representative of a desired speed of the AC motor and with the duration of the variable pulses, during which current is supplied to the winding by the power switches, being representative of a desired output voltage to the winding of the AC motor, the improvement comprising:

means which is DC coupled to said AC motor winding for producing a feedback signal representative of the output voltage to said AC motor winding:

means for producing and storing a plurality of values representative of output voltages as a function of said feedback voltage and producing a feedback signal that is linearized with respect to frequency in response to said feedback voltage;

means responsive to the linearized feedback signal for establishing a desired duration of the duration variable pulses, commensurate with the frequency of the square wave signals and a desired voltage per hertz relationship at the AC motor winding;

means for determining whether the AC motor speed is within a low speed boost region and producing a low speed signal indicative thereof; and means responsive to the low speed signal for generating a boost signal representative of a desired output voltage to the AC motor winding, said boost signal generating means including means for producing a plurality of look-up tables composed of values for the boost signal at predetermined speed ranges of the AC motor.

2. A speed and torque controller for an AC motor having windings, comprising:

means for producing a source of high DC voltage electrical power across a high voltage buss and a return buss, said DC voltage source being sufficient to derive therefrom an AC power drive for said AC motor windings;

controllable switch means interposed between the busses and the AC motor windings and electrically coupled thereto so as to alternately deliver electrical power in opposite directions through the AC motor windings; said switch means comprising a first part operatively coupled between the high voltage buss and ends of the windings and a second part operatively coupled between the return buss and ends of the windings, with each part formed of a plurality of switches respectively coupling the high voltage buss to a different end of said windings and coupling the return buss to said same winding ends;

means for generating square wave signals with a frequency commensurate with a desired speed of the AC motor and with a phase relationship adapted to the phase of the AC motor windings, said square wave signals having equal duration on-segments and off-segments;

first means coupling the square wave signals to switches in the first part of the switch means so as to render said latter switches conductive during the on-segment and non-conductive during the off-segment of the square wave signals in a sequence that is commensurate with the phase of said windings;

means for generating a plurality of equal duration controlled pulses during one-half of respective square wave signals, with the duration of the pulses being commensurate with a desired output voltage to the AC motor windings; and second means for coupling, in phase with the first coupling means, duration-controlled pulses to those switches in the second part of the switch means to enable current flow through the windings coupled to the high voltage buss by those switches that are rendered conductive by the square wave signals, whereby current is delivered to said AC motor windings and the voltage thereto is regulated by only pulsing a portion of the switch means at the high rate of the duration-controlled pulses;

means, which is DC coupled to ends of the AC motor windings, for producing a feedback signal representative of a combination of the voltages applied to a plurality of output windings by said power switches;

means for producing and storing a plurality of values representative of output voltages as a function of said feedback voltage and producing a feedback signal that is linearized with respect to frequency in response to said feedback voltage;

means responsive to the linearized feedback signal for establishing a desired duration of the duration-controlled pulses, commensurate with the frequency of the square wave signals and a desired voltage per hertz relationship at the AC motor windings;

means for generating a deceleration signal representative of a selected deceleration rate for the AC motor;

means responsive to the deceleration signal for generating a train of pulses whose individual durations are proportional to the selected deceleration rate; and means responsive to the latter train of pulses for absorbing electrical energy from the high DC voltage buss during deceleration of the AC motor.

3. In a voltage control for an AC motor speed and torque controller having at least one winding to which electrical power is delivered from a high voltage buss and a low voltage buss which are coupled to a high voltage DC power source by power switches that are interposed so as to deliver opposite current flows alternately through the winding, the improvement comprising:

means, which is DC coupled to the winding, for producing a feedback signal representative of the voltage applied to the winding;

means for producing and storing a plurality of values representative of output voltages as a function of said feedback voltage and producing a feedback signal that is linearized with respect to frequency in response to said feedback voltage; and means responsive to the linearized feedback signal for establishing a desired duration of the duration-controlled pulses, commensurate with the frequency of the square wve signals and a desired voltage per hertz relationship at the AC motor windings.

* * * * *